United States Patent [19]
Dietsche et al.

[11] 3,718,661
[45] Feb. 27, 1973

[54] PHOSPHORIC ESTERS

[75] Inventors: Wolfram Dietsche, 58 Moltkestrasse, 6701 Altrip; Heinrich Adolphi, 11 Kalmitiveg, 6703 Limburgerhof; Peter Beutel, 27 Strahlenburgstrasse, 6800 Mannheim; Karl-Heinz Koenig, 8a Pierstrasse, 6710 Frankenthal, all of Germany

[22] Filed: Sept. 25, 1970

[21] Appl. No.: 75,704

[52] U.S. Cl.........260/308 C, 260/468 C, 260/471 C, 260/482 C, 424/200, 424/269
[51] Int. Cl. ..............................A01n 9/36, C07f 9/16
[58] Field of Search ..................................260/308 C

[56] References Cited

UNITED STATES PATENTS 3,594,390   7/1971   Timmler et al. ......................260/308

*Primary Examiner*—Alton D. Rollins
*Attorney*—Johnston, Root, O'Keeffe, Keil, Thompson & Shurtleff

[57] ABSTRACT

New and valuable substituted O,O-dialkylthionophosphoric esters having a good insecticidal action and a process for controlling insects with these compounds.

5 Claims, No Drawings

PHOSPHORIC ESTERS

The present invention relates to new and valuable 0,0-dialkylthionophosphoric esters and insecticides containing these compounds.

It is known from Belgian Patent No. 609,209 to use dithiophosphoric esters as insecticides; however, their action is not satisfactory.

We have now found that 0,0-dialkylthionophosphoric esters having the formula

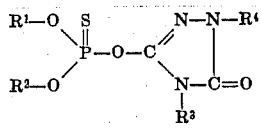

where
R¹ and R² are identical or different and each denotes a lower alkyl radical (methyl, ethyl),
R⁴ denotes hydrogen or lower alkyl (methyl, ethyl, n-propyl, isopropyl, isobutyl, sec-butyl), cycloalkyl (cyclohexyl), aryl (phenyl) or substituted aryl ((o-, m- and p-) chlorophenyl, m-CF₃-phenyl, m-nitro, p-nitro, 2,4-dinitro, p-tolyl, p-bromophenyl, 2,4,6-trichlorophenyl) and
R³ denotes lower alkyl (methyl, ethyl, n-propyl, isopropyl, isobutyl, sec-butyl), lower alkenyl (allyl), lower alkoxyalkyl (3-methoxypropyl, 3-ethoxylpropyl, 2-methoxylethyl, 2-ethoxyethyl), lower alkyl-thioalkyl (3-methylthiopropyl, 3-ethylthiopropyl), haloalkyl (γ-chloropropyl, β-chloroethyl, monochloro-tert-butyl, 1-chloromethylpropyl-1, β-chloro-n-propyl), lower alkoxycarbonylethyl (α-carbalkoxymethyl, α-carbomethoxymethyl, α-carbethoxymethyl, α-carbon-propoxymethyl, α-carboisopropoxymethyl, α-methyl-α-carbalkoxymethyl), aryl (phenyl) or substituted aryl,
have a good insecticidal action.

The new active ingredients may be prepared by reacting 0,0-dialkylthionophosphoric ester halides having the formula

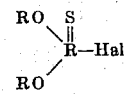

where R has the above meanings and Hal denotes a halogen atom, with urazoles having the formula

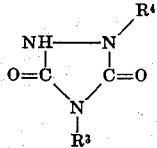

where R³ and R⁴ have the above meanings.

The urazoles may be prepared in conventional manner (v. C.A.55, 22298 h, Arch. Pharm. 299 (1) 43-45 [1966]) as follows:

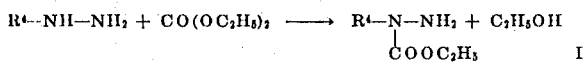

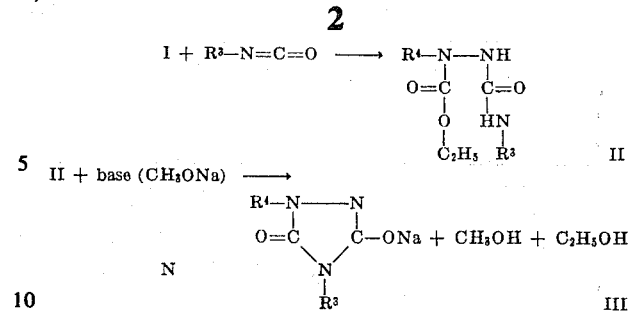

The corresponding hydrazocarboxylic ester, to which isocyanate is added on and which is subsequently cyclized with a suitable base, is thus obtained from the hydrazine component with diethyl carbonate.

The substituted R⁴ of the hydrazine component denotes lower alkyl or cyclohexyl, aryl or substituted aryl, and R³ in the isocyanate denotes lower alkyl (methyl, ethyl, n-propyl, isopropyl, n-butyl, secbutyl, tert-butyl), lower alkoxyalkyl, lower alkylmercaptoalkyl, haloalkyl, lower alkoxycarbonylethyl, cycloalkyl (cyclohexyl), aryl or substituted aryl. Suitable aryl substituents are: 1 to 3 halogen atoms (chlorine or bromine), trifluoromethyl, methylsulfonyl, lower alkyl and lower alkoxyl. The aromatic may be substituted by several different groups selected from those listed.

The active ingredients are preferably produced in the presence of acid binding agents; suitable agents are alkali metal carbonates, alkali metal alcoholates, alkali metal hydroxides and organic bases. Another preferred method consists in reacting the alkali metal salts of the urazoles mentioned above with thionophosphoric ester chlorides of the above formula. The reaction is advantageously carried out in an inert organic solvent at a moderate (30° to 100° C) temperature. Ketones, benzene, dioxane, toluene, nitriles such as acetonitrile, propionitrile, dimethylformamide and esters of organic acids have proved to be particularly suitable as solvent. The yield may be increased by heating and stirring the mixture for a fairly long time at the recommended temperature after the starting materials have been mixed. The thionophosphoric ester chlorides used as starting materials are known in the art. Owing to the large number of suitable isocyanates and hydrazines, many differently substituted urazoles may be obtained whose phosphoric esters have excellent insecticidal properties.

The new thionophosphoric esters are usually colorless to yellow oils which are insoluble in water and are difficult to distil, even at a substantial subatmospheric pressure, without any decomposition occuring. They have an excellent action on a plurality of insect pests (aphids, mosquits larvae, caterpillars, houseflies), and some of them have a low toxicity on warm bloods. Because of their excellent insecticidal properties the active ingredients are most suitable as pesticides in the plant protection field.

The production of the compounds is illustrates below with reference to examples:

The urazoles described in the literature are predominantly those having aromatic substituents. Cyclization in accordance with equation (III) is therefore usually carried out in aqueous systems with caustic soda solution, followed by the precipitation with acids of the water-insoluble urazole. This method for isolation cannot, however, be used with urazoles bearing only aliphatic substituents, as these urazoles dissolve very readily in water.

The process for cyclizing type II compounds has therefore been modified. The sodium salts of the type III urazoles may be obtained directly in pure form by slowly adding a methanolic solution of the stoichiometric amount of technical grade sodium methylate or 50 percent aqueous caustic soda solution to a boiling solution of II in 98 percent ethanol. After a short reaction time, the urazole salt III is precipitated upon cooling, either directly or after benzene has been added. Where no spontaneous crystallization of the salts occurs, the solution may be concentrated or evaporated to dryness since the reaction proceeds almost quantitatively. The urazole salts obtained by this procedure are usually sufficiently pure for subsequent phosphorylation.

Preparation of the sodium salt of 2-methyl-4-allyl-1,2,4-triazolidine-dione-3,5

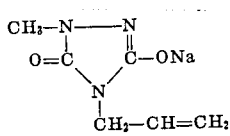

59 parts by weight of ethyl methylhydrazinecarboxylate is dissolved in 150 parts of benzene; 0.5 part of triethylamine is added and 45.7 parts of allyl isocyanate in 50 parts of benzene is dripped in. The reaction proceeds exothermically and, to complete the reaction, the mixture is stirred for a further hour at 60° C. After removal of the benzene, the oily residue is taken up in 150 parts of ethanol and 85 parts of 32 percent by weight methanolic sodium methylate solution is dripped in. The whole is subsequently stirred for an hour at 60° C, after which the solvent is removed. The powdered product is completely freed from solvent by treatment in a rotary evaporator for an hour at 60° C. Yield: 95 percent of the theory, m.p. 235°–248° C.

Calc.: C: 40.7; H: 4.52; N: 23.7
Found: C: 41.1; H: 5.0; N: 22.9

The invention is illustrated by way of the following examples.

EXAMPLE 1

Preparation of 0,0-diethyl-0-[1,4-dimethyl-1,2,4-triazolon-(5)-yl-(3)]-thionophosphate

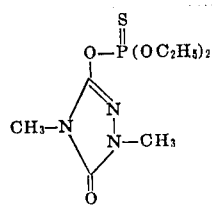

22.6 parts by weight of the sodium salt of 1,4-dimethyl-1,2,4-triazolidinedione-3,5 is suspended in 150 parts of acetonitrile. While stirring thoroughly, 284 parts of diethylthionophosphoryl chloride is added at 50° C over a period of 5 to 10 minutes. The mixture is then boiled under reflux for 5 hours. The end of the reaction is easily detectable by the change from the initial coarse suspension to a very finely divided suspension of precipitated sodium chloride. Without previous separation of the sodium chloride (extremely difficult to filter off as a result of the fine dispersion), the reaction mixture is evaporated at 60° C in a rotary evaporator using a water jet vacuum and the oily residue is taken up in 300 parts of benzene. The solution is washed once with 50 parts of saturated aqueous sodium hydrogen carbonate solution and twice with 50 parts each time of 3 percent aqueous sodium hydrogen carbonate solution, after which the solution is dried over anhydrous sodium sulfate. After evaporation in a rotary evaporator under a water jet vacuum and devolatilization for 2 hours under an oil pump vacuum (approx. 0.5 mm) at 90° C, there remains 30 parts (71.3 percent yield) of a pale yellow oil having a refractive index $n_D^{20} = 1.4905$.

Analysis (in %)
Calc.: C: 34.2; H: 5.7; P: 11.0): S: 11.4
Found: C; 34.0; H: 5.9; P: 10.6; S: 11.6
$LD_{50} = 50$ mg/kg of rat

EXAMPLE 2

Preparation of 0,0-dimethyl-0-[1,4-dimethyl-1,2,4-triazolon-(5)-yl-(3)]-thionophosphate

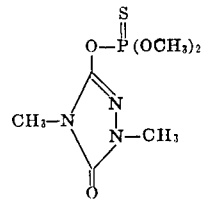

22.6 parts of the sodium salt of 1,4-dimethyl-1,2,4-triazolidinedione-3,5 is suspended in 150 parts of anhydrous benzene. After an addition of 0.26 part of finely powdered $CuCl_2 \cdot 2H_2O$, 24.1 parts of dimethylthionophosphoryl chloride is added at 50°C over a period of 10 minutes and while stirring thoroughly. The whole is then stirred for 4 hours at 50° C and subsequently boiled for 6 hours under reflux. The reaction mixture is worked up as described in Example 1. After de-volatilization for 2 hours under an oil pump vacuum (0.5 mm) at 90° C, there remains 14.5 parts (a yield of 38.2 percent) of a pale yellow oil having a refractive index $n_D^{20} = 1.5060$.

Analysis (in %)
Calc.: C: 28.4; H: 4.7; N: 16.6; P: 12.2; S: 12.7
Found: C: 28.4; H: 4.9; N: 17.0; P: 11.5; S: 12.5

EXAMPLE 3

Preparation of 0,0-diethyl-0-[4-phenyl-1,2,4-triazolon-(5)-yl-(3)]-thionophosphate

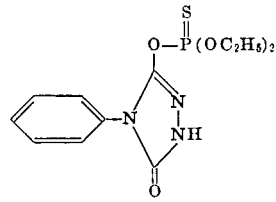

35.4 parts of 4-phenyl-1,2,4-triazolidinedione-3,5 is suspended in 150 parts of methanol. While stirring and cooling with ice, 35.4 parts of sodium methylate (32 percent in methanol) dissolved in 100 ml of methanol is dripped in; a clear solution is formed. After evaporation in a rotary evaporator there remains a crystalline mass of the monosodium salt of 4-phenyl-1,2,4- triazolidinedione-3,5 which is suspended in 200 parts of acetonitrile. While stirring thoroughly, 37.8 parts of diethylthionophosphoryl chloride is dripped in at room temperature and the whole then boiled under reflux for 5 hours. The reaction mixture is worked up as described in Example 1. There is obtained 42 parts of a turbid oil from which crystals separate out after standing for 3 days. After diluting with 25 ml of benzene, suction filtering and washing twice with benzene, 14.7 parts (a yield of 22.3 percent) of a crystalline substance having a melting point of 110° to 111° C is obtained. Analysis reveals the substance obtained to be the desired phosphorylation product.

Analysis
  Calc.: C: 43.8; H: 4.9; N: 12.8; P: 9.4; S: 9.7
  Found: C: 44.1; H: 5.0; N: 12.9; P: 9.6; S: 9.8

The compounds listed below may be prepared analogously; in all cases the substances are fairly thin oils which even under a high vacuum cannot be distilled without decomposition occurring.

Compounds having the general formula:

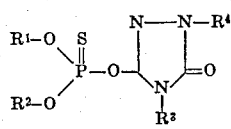

| No. | R¹,R² | R³ | R⁴ | $n_D^{20}$ |
|---|---|---|---|---|
| 1 | -C₂H₅ | CH₃ | H | 1.4971 |
| 2 | -C₂H₅ | CH₃ | CH₃ | 1.4905 |
| 3 | -C₂H₅ | C₂H₅ | CH₃ | 1.4858 |
| 4 | -C₂H₅ | C₃H₇ | CH₃ | 1.4850 |
| 5 | -C₂H₅ | iC₃H₇ | CH₃ | 1.4841 |
| 6 | -C₂H₅ | C₄H₉ | CH₃ | 1.4838 |
| 7 | -C₂H₅ | sec-C₄H₉ | CH₃ | 1.4803 |
| 8 | -C₂H₅ | tert-C₄H₉ | CH₃ | 1.4849 |
| 9 | -C₂H₅ | -CH₂-CH=CH₂ | CH₃ | 1.4911 |
| 10 | -C₂H₅ | cyclohexyl | CH₃ | 1.4973 |
| 11 | -C₂H₅ | phenyl | CH₃ | 1.5291 |
| 12 | -C₂H₅ | phenyl | H | 1.5340 |
| 13 | -C₂H₅ | CH₃ | iC₃H₇ | 1.4802 |
| 14 | -C₂H₅ | C₂H₅ | iC₃H₇ | 1.4755 |
| 15 | -C₂H₅ | iC₃H₇ | iC₃H₇ | 1.4720 |
| 16 | -C₂H₅ | C₄H₉ | iC₃H₇ | 1.4750 |
| 17 | -C₂H₅ | -CH₂-COO-C₂H₅ | CH₃ | 1.4842 |
| 18 | CH₃ | CH₃ | CH₃ | 1.5060 |
| 19 | CH₃ | C₃H₇ | CH₃ | 1.4944 |
| 20 | C₃H₇ | -CH₂-CH₂Cl | CH₃ | 1.4970 |
| 21 | C₃H₇ | -CH₂-CH(Cl)CH₃ | CH₃ | 1.4948 |
| 22 | C₃H₇ | phenyl, phenyl | | 1.5711 |
| 23 | C₂H₅ | (CH₂)₃-O-CH₃ | CH₃ | 1.4869 |
| 24 | C₂H₅ | -C₆H₄-CF₃ | CH₃ | m.p. 56°–57°C |
| 25 | C₂H₅ | -C₆H₄-Cl | CH₃ | $n_D^{25}=1.5411$ |
| 26 | C₂H₅ | -C₆H₄-CH₃ | CH₃ | m.p. 59°–60°C |
| 27 | C₂H₅ | -C₆H₃(Cl)-Cl | CH₃ | m.p. 82°–83°C |
| 28 | C₂H₅ | -C₆H₃(Cl)-Br | CH₃ | 1.5537 |
| 29 | C₂H₅ | -C₆H₄-CH₃ | CH₃ | 1.5311 |
| 30 | C₂H₅ | -CH₂-CH₂-S-C₂H₅ | CH₃ | 1.5099 |
| 31 | C₂H₅ | -CH₂-CH₂-Cl | CH₃ | 1.5040 |
| 32 | C₂H₅ | -CH(CH₃)-CH₂-Cl | CH₃ | 1.500 |
| 33 | C₂H₅ | HC≡C-C(CH₃)₂- | CH₃ | 1.4902 |
| 34 | C₂H₅ | HC≡C-C(CH₃)(C₂H₅)- | CH₃ | 1.4921 |
| 35 | C₂H₅ | Br-CH₂C(CH₃)₂- | CH₃ | |
| 36 | C₂H₅ | Cl-H₂C-C(CH₂Cl)₂- | CH₃ | |
| 37 | C₂H₅ | H₃C-C(CH₂Cl)₂- | CH₃ | |
| 38 | C₂H₅ | H₅C₂-C(CH₂Cl)₂- | CH₃ | |
| 39 | CH₃ | -C₆H₄-C(CH₃)₃ | CH₃ | |
| 40 | CH₃ | CH₃-S-CH₂-C(CH₃)₂- | CH₃ | |

| | | | |
|---|---|---|---|
| 41 | CH₃ | 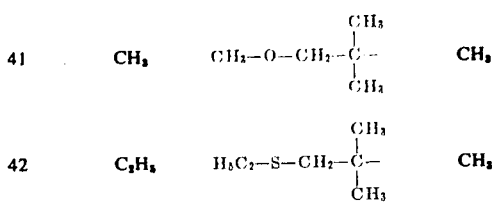 | CH₃ |
| 42 | C₂H₅ | | CH₃ |
| 43 | C₂H₅ | | CH₃ |
| 44 | C₂H₅ | 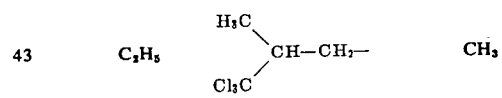 | CH₃ |
| 45 | C₂H₅ | -CH₂-CH₂-CH₂-CH₂-CH₃ | CH₃ |
| 46 | C₂H₅ | 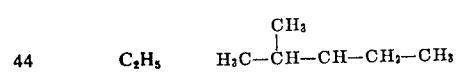 | CH₃ |
| 47 | CH₃ | 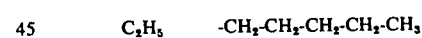 | CH₃ |
| 48 | C₂H₅ | 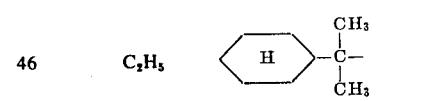 | CH₃ |
| 49 | C₂H₅ |  | CH₃ |
| 50 | C₂H₅ | 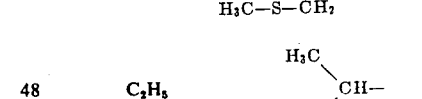 | CH₃ |
| 51 | C₂H₅ | 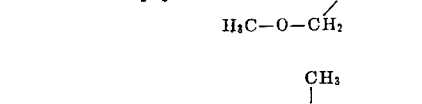 | CH₃ |

The insecticides according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons such as tetrahydronaphthalene, and alkylated anphthalenes may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents. Concentrates which are suitable for dilution with water may be prepared from active ingredient, emulsifying or dispersing agent and possibly solvent.

Dusts may be prepared by mixing or grinding the active ingredients with a solid carrier.

The following examples demonstrate the excellent insecticidal action of the new active ingredients.

For comparison purposes, the compound described in Belgian Patent No. 609,209

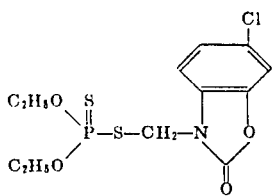

is used.

The active ingredient numbers correspond to those given in the above table.

EXAMPLE 4

Adult oriental cockroaches (*Blatta orientalis*) are placed in 1 liter jars whose inside walls have been wetted with the solutions of the active ingredients. The action is determined after 48 hours.

| Active ingredient | Lowest effective amount in mg of active ingredient per jar |
|---|---|
| A | 2.5 |
| 1 | 0.5 |
| 2 | 0.1 |
| 3 | 0.1 |
| 4 | 0.1 |
| 5 | 0.05 |
| 6 | 0.5 |
| 7 | 0.05 |
| 8 | 0.1 |
| 9 | 0.1 |
| 10 | 1.0 |
| 11 | 0.25 |
| 12 | 1.0 |
| 13 | 0.1 |
| 14 | 0.25 |
| 15 | 0.05 |
| 17 | 0.1 |
| 19 | 0.25 |
| 20 | 0.25 |
| 24 | 0.5 |
| 25 | 0.5 |
| 26 | 0.5 |
| 27 | 1.0 |
| 28 | 1.0 |
| 29 | 0.25 |
| 21 | 0.25 |
| 31 | 0.25 |
| 32 | 0.25 |

EXAMPLE 5

Action on mosquito larvae (*Aedes aegypti*)

Mosquito larvae in the fourth larval stage are exposed to the action of aqueous emulsions of the active ingredients. The concentration (in ppm) of the active ingredient in water is the amount achieving a larvae kill rate of more than 90 percent.

| Active ingredient | Concentration of the active ingredient in ppm |
|---|---|
| A | 1.0 |
| 1 | 0.2 |
| 2 | 0.1 |
| 3 | 0.25 |
| 4 | 0.25 |
| 6 | 0.25 |
| 7 | 0.25 |
| 8 | 0.25 |
| 9 | 0.25 |
| 10 | 0.5 |
| 11 | 0.25 |
| 12 | 0.25 |
| 13 | 0.05 |
| 25 | 0.25 |
| 26 | 0.5 |
| 27 | 0.5 |
| 29 | 0.5 |
| 31 | 0.5 |
| 32 | 0.25 |

EXAMPLE 6

1 mm³ of the acetonic solution of the active ingredients is administered to the ventral abdomen of houseflies (*Musca domestica*) under $CO_2$ narcosis.

The LD$_{50}$ may be calculated from the results obtained by using different concentrations of the active ingredients in acetone. The mortality after 4 hours is taken as a basis.

| Active ingredient | LD$_{50}$ |
| --- | --- |
| A | 1.0 γ/fly |
| 2 | 0.1 γ/fly |
| 3 | 0.33 γ/fly |
| 4 | 0.45 γ/fly |
| 5 | 0.4 γ/fly |
| 6 | 0.3 γ/fly |
| 7 | 0.3 γ/fly |
| 8 | 0.4 γ/fly |
| 9 | 0.3 γ/fly |
| 10 | 0.6 γ/fly |
| 11 | 0.45 γ/fly |
| 14 | 0.08 γ/fly |
| 15 | 0.35 γ/fly |
| 18 | 0.5 γ/fly |

We claim:

1. A phosphoric ester of the formula $$\begin{array}{c} R^1-O \\ R^2-O \end{array} \!\! \begin{array}{c} S \\ \| \\ P \end{array} \!\! -O-C \begin{array}{c} N-N-R^4 \\ | \\ N-C=O \\ | \\ R^3 \end{array}$$

wherein
R$^1$ and R$^2$ each denotes lower alkyl of 1 to 2 carbon atoms,
R$^4$ denotes a member selected from the group consisting of hydrogen, alkyl of 1 to 4 carbon atoms, cyclohexyl, phenyl and phenyl substituted by chloro-, bromo-, methyl-, trifluoromethyl- or nitro-, and
R$^3$ denotes a member selected from the group consisting of alkyl of 1 to 6 carbon atoms, alkenyl of 3 to 6 carbon atoms, alkoxyalkyl of up to 5 carbon atoms, alkylthioalkyl of up to 6 carbon atoms, chloro- or bromo-substituted alkyl of up to 5 carbon atoms, lower alkoxycarbonylmethyl of 1 to 3 carbon atoms in the alkoxy group, cyclohexyl, phenyl, phenyl substituted by chloro-, bromo-, methyl- or trifluoromethyl-, and further members represented by the radical $$HC\equiv\overset{\displaystyle CH_3}{\underset{\displaystyle R'}{C}}-C-$$

wherein R' is methyl, ethyl or phenyl, or the radical $$R''-\overset{\displaystyle CH_3}{\underset{\displaystyle CH_3}{C}}-$$

wherein R'' is cyclohexyl or phenyl.

2. A compound of the formula $$\begin{array}{c} C_2H_5-O \\ C_2H_5-O \end{array} \!\! \begin{array}{c} S \\ \| \\ P \end{array} \!\! -O- \begin{array}{c} N---N-CH_3 \\ | \\ N \\ | \\ R^3 \end{array} \!\! =O$$

wherein R$^3$ is a member selected from the group consisting of methyl, ethyl, propyl, butyl, sec-butyl, tert-butyl and allyl.

3. A compound of the formula $$\begin{array}{c} C_2H_5-O \\ C_2H_5-O \end{array} \!\! \begin{array}{c} S \\ \| \\ P \end{array} \!\! -O- \begin{array}{c} N---N-CH \\ | \\ N \\ | \\ R^3 \end{array} \!\! \begin{array}{c} CH_3 \\ CH_3 \end{array} =O$$

wherein R$^3$ is a member selected from the group consisting of methyl, ethyl, isopropyl and butyl.

4. The compound of the formula $$\begin{array}{c} C_2H_5-O \\ C_2H_5-O \end{array} \!\! \begin{array}{c} S \\ \| \\ P \end{array} \!\! -O- \begin{array}{c} N---N-CH_3 \\ | \\ N \\ | \\ R^3 \end{array} \!\! =O$$

5. The compound of the formula $$\begin{array}{c} C_2H_5-O \\ C_2H_5-O \end{array} \!\! \begin{array}{c} S \\ \| \\ P \end{array} \!\! -O- \begin{array}{c} N---N-CH \\ | \\ N \\ | \\ R^3 \end{array} \!\! \begin{array}{c} CH_3 \\ CH_3 \end{array} =O$$

* * * * *

PO-1050
(5/69)

UNITED STATES PATENT OFFICE
CERTIFICATE OF CORRECTION

Patent No. 3,718,661                           Dated February 27, 1973

Inventor(s) Wolfram Dietsche et al

It is certified that error appears in the above-identified patent and that said Letters Patent are hereby corrected as shown below:

First page, left-hand column, fourth line, "Kalmitiveg" should read -- Kalmitweg --; eighth line, insert -- [75]  Assignee: Badische Anilin- & Soda-Fabrik Aktiengesellschaft, Ludwigshafen/Rhine, Germany --;

eleventh line, insert

-- [30]    Foreign Application Priority Data

October 1, 1969    Germany . . . . . P 19 49 490.7 --.

Column 2, line 9, delete the "N" standing by itself.

Column 4, line 14, "P: 11.0)" should read -- P: 11.0 --.

Column 7, line 53, "anphthalenes" should read -- naphthalenes --.

Column 10, lines 42 to 48, claim 5

"$C_2H_5$-O S   N— N-$CH_3$" should read --   $CH_3$-O S   N— N-$CH_3$  --;

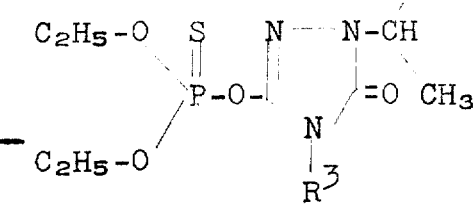    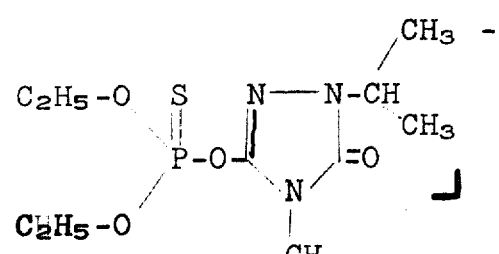

lines 33 to 37, claim 4
"              $CH_3$" should read --                              $CH_3$ -

Signed and sealed this 12th day of February 1974.

(SEAL)
Attest:

EDWARD M. FLETCHER, JR.                C. MARSHALL DANN
Attesting Officer                       Commissioner of Patents